United States Patent
Meandzija et al.

(10) Patent No.: US 7,266,685 B1
(45) Date of Patent: Sep. 4, 2007

(54) TIME CERTIFICATION IN A WIRELESS COMMUNICATIONS NETWORK

(75) Inventors: Branislav N. Meandzija, Del Mar, CA (US); Mithat Can Dogan, Sunnyvale, CA (US); Marc C. Goldburg, Redwood City, CA (US)

(73) Assignee: ArrayComm, LLC, San Jose, CA (US)

( * ) Notice: Subject to any disclaimer, the term of this patent is extended or adjusted under 35 U.S.C. 154(b) by 779 days.

(21) Appl. No.: 10/603,422

(22) Filed: Jun. 24, 2003

(51) Int. Cl.
*H04L 9/00* (2006.01)

(52) U.S. Cl. ............... 713/156; 380/268; 380/270; 380/277

(58) Field of Classification Search ........... 713/156; 380/270, 268, 277
See application file for complete search history.

(56) References Cited

U.S. PATENT DOCUMENTS

| | | | |
|---|---|---|---|
| 5,604,733 A * | 2/1997 | Hargrave | 370/337 |
| 6,189,098 B1 * | 2/2001 | Kaliski, Jr. | 713/168 |
| 6,415,154 B1 * | 7/2002 | Wang et al. | 455/456.1 |
| 6,603,976 B1 * | 8/2003 | Amirijoo et al. | 455/456.1 |
| 6,760,752 B1 * | 7/2004 | Liu et al. | 709/206 |
| 7,100,200 B2 * | 8/2006 | Pope et al. | 726/10 |
| 2002/0056050 A1 * | 5/2002 | Heiden et al. | 713/201 |
| 2004/0066736 A1 * | 4/2004 | Kroeger | 370/200 |
| 2006/0078124 A1 * | 4/2006 | Whelan et al. | 380/273 |

* cited by examiner

*Primary Examiner*—Taghi Arani
(74) *Attorney, Agent, or Firm*—Blakely Sokoloff Taylor & Zafman LLP (57) ABSTRACT

The time reference of a user terminal that is derived from an unauthenticated access point can be certified by a trusted entity according to the present invention. In one embodiment, the present invention includes a user terminal obtaining a time reference from an access point of a wireless access network. The user terminal then receives a digital certificate having a validity period from the access point, the certificate being issued by a certificate authority. In one embodiment, the user terminal requests certification of the time reference by a trusted entity, and receives the certification. Then the user terminal can validate the digital certificate.

31 Claims, 5 Drawing Sheets

TIME CERTIFICATION IN A WIRELESS COMMUNICATIONS NETWORK

BACKGROUND OF THE INVENTION

1. Field of the Invention

The present invention applies to the field of hardware authentication, in particular to time certification in a wireless network.

2. Description of the Prior Art

Hardware authentication, also sometimes referred to as entity authentication, is the process of verifying a claimed or presumed identity. In the context of a wireless access network, hardware authentication is used to verify that a an entity is indeed the entity it is claiming to be. For example, a hardware authentication can verify that a terminal claiming to have a certain MAC address really has the claimed MAC address. Without hardware authentication, unauthorized user terminals could steal the resources of the wireless access network, and uplink and downlink communications between legitimate user terminals and access points may be intercepted and eavesdropped.

Hardware authentication in wireless networks is currently accomplished by time varying challenge-response protocols. In a typical challenge-response protocol a claimant proves its identity to a verifier by demonstrating knowledge of a secret known to be associated with the claimant.

One problem with challenge-response protocols is that the verifier needs access to a secure database to identify the secret the claimant should have. Furthermore, such protocols require several message exchanges and on-the-fly encryption that can slow down network access.

User terminals getting their sense of time from access points can cause another problem in some wireless access networks. The access point can get their time from wired networks, or the Global Positioning System. Before the terminal can authenticate the access point it may need a sense of time. However, the access point is not yet authenticated. Thus, its time reference cannot always be trusted.

BRIEF SUMMARY OF THE INVENTION

The time reference of a user terminal that is derived from an unauthenticated access point can be certified by a trusted entity according to the present invention. In one embodiment, the present invention includes a user terminal obtaining a time reference from an access point of a wireless access network. The user terminal then receives a digital certificate having a validity period from the access point, the certificate being issued by a certificate authority. In one embodiment, the user terminal requests certification of the time reference by a trusted entity, and receives the certification. Then the user terminal can validate the digital certificate.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

In one embodiment, the UT derives its sense of time from the BS. As part of authentication, the UT can request a certified timestamp from a trusted entity such as a times server or a certificate authority.

Wireless Access Network

Figure 1:
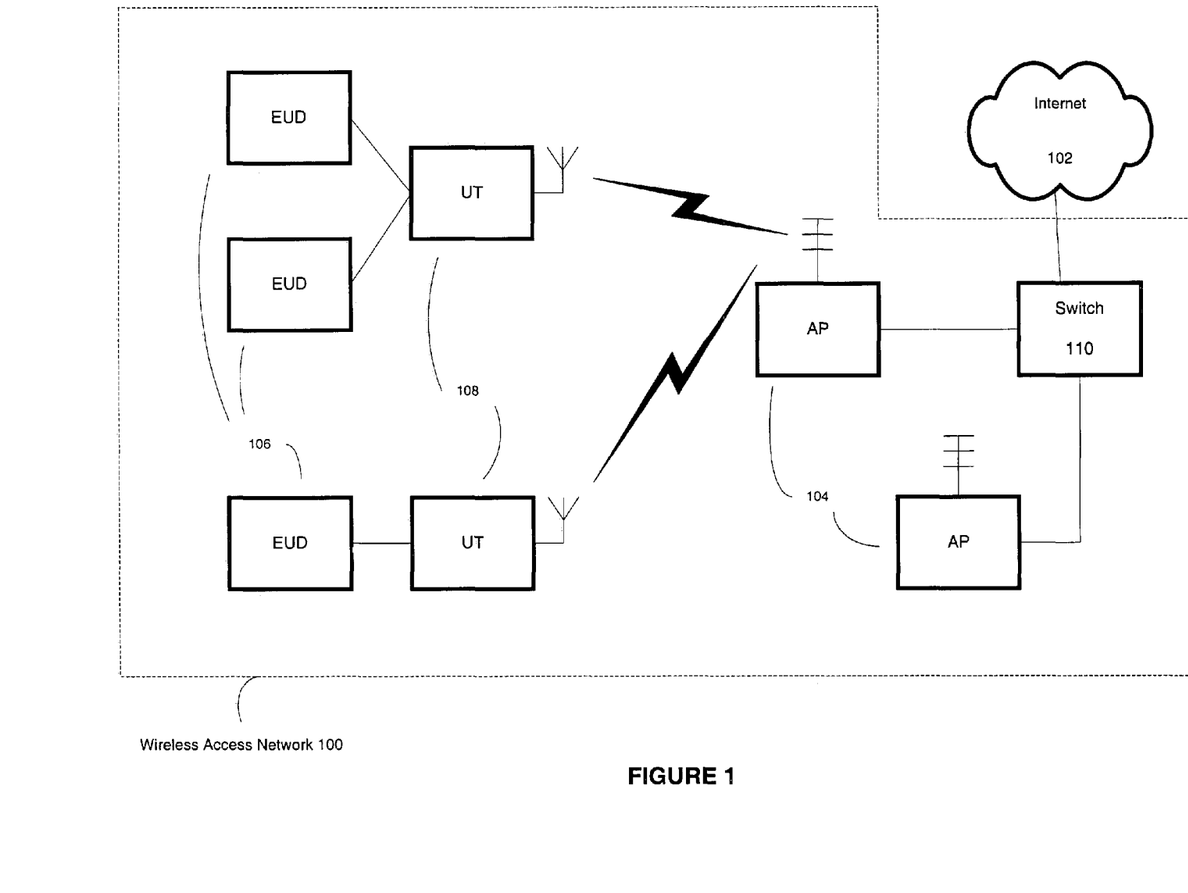
FIG. 1 is a simplified block diagram of a wireless access network in which one embodiment of the present invention can be practiced.

An example system that can be improved by using embodiments of the present invention is now described with reference to FIG. 1. FIG. 1 shows a wireless access network 100. The wireless access network can be used to provide access to the Internet 102, or any other data network, such as a LAN or WAN.

The wireless access network 100 includes wireless access points 104 ("AP") to allow end user devices 106 ("EUD") to communicate using wireless user terminals 108 ("UT"). An EUD 106 is generally a mobile computing device, such as a laptop or notebook computer, a personal digital assistant ("PDA"), or a cellular telephone. However, an EUD 106 can be any other computing device, such as a desktop computer or a workstation.

A UT 108 can be implemented as a stand-alone unit, such as a PCMCIA card or box, or be integrated into the body of the EUD 106. One UT 108 can provide communications for just one EUD 106 or a group of EUDs 106. The UT 108 is a communications device analogous to a modem. The UT 108 can be responsible for radio communications and physical layer signal processing. Higher lever processing can be performed by either the UT 108 or a host EUD 106.

The UT 108 communicates wirelessly, e.g. using radio signals, with an AP 104. An AP can be a cellular base station, an 802.11 access point, or other wireless system access point, such as an i-Burst™ base station. Multiple APs can be connected by a switch 110 or router to centralize the connection to the Internet 102 and to facilitate handoffs when a UT 108 moves from one AP 104 zone into another. The wireless access network 100 can be used to provide access to networks besides the Internet 102, such as Wide Area Network, Local Area Network, or the Public Switched Telephone Network.

Embodiment of the present invention need not be practiced in a strict wireless access network context. For example, one embodiment of the present invention may be in a wireless peer-to-peer network. During authentication however, one peer will be acting as an AP 104 and the other as the UT 108 of a wireless access network.

Authentication Protocol

Figure 2:
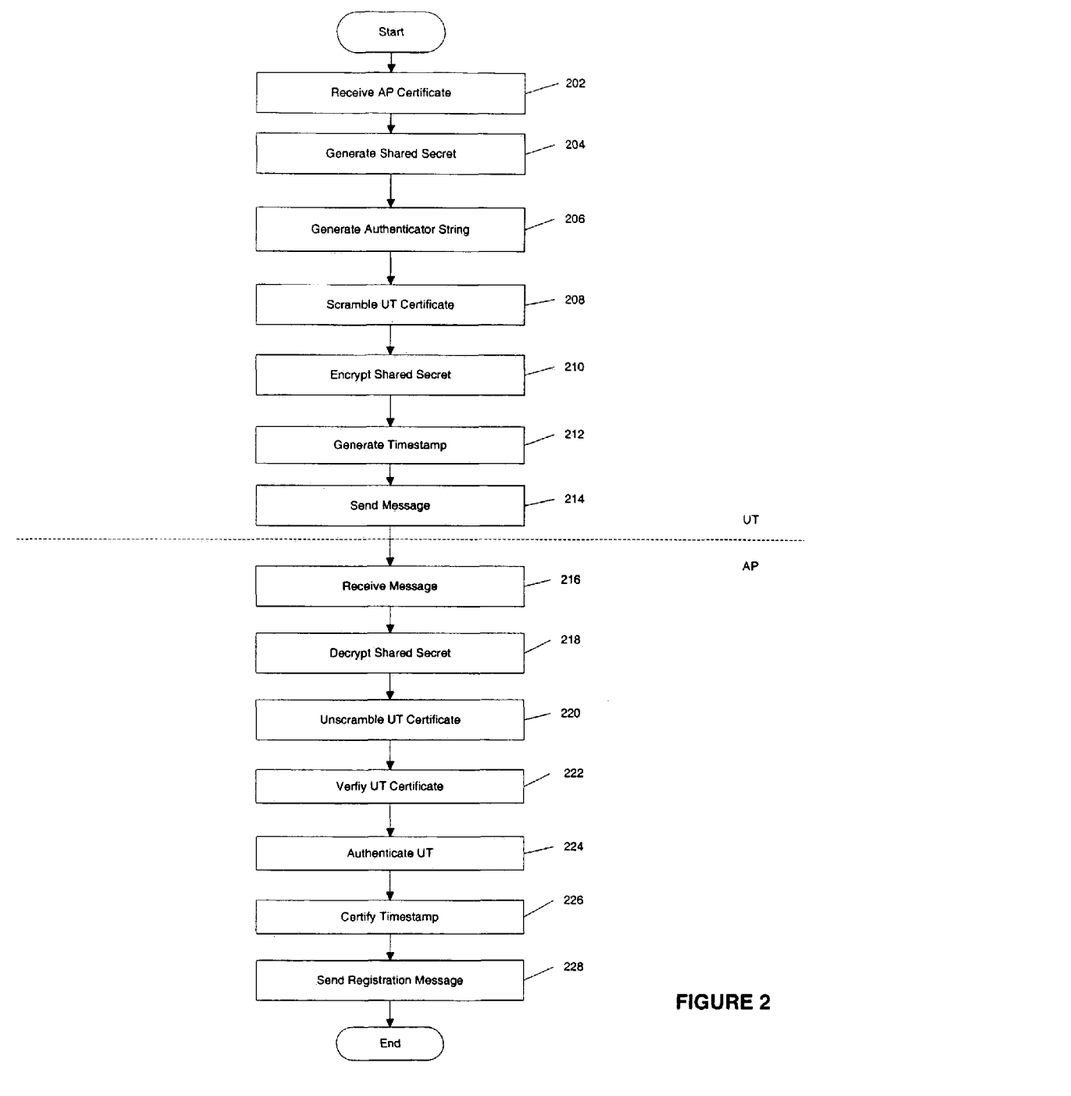
FIG. 2 is a simplified flow chart of an authentication protocol according to one embodiment of the present invention.

An authentication protocol according to one embodiment of the present invention is shown in FIG. 2. Several embodiments of the present invention are described with reference to FIG. 2. Furthermore, FIG. 2 also contains details not necessary to practice the present invention that are provided for clarity and context. The process and message exchange described with reference to FIG. 2 is mostly related to UT 108 authentication. However, the process can also result in AP 104 authentication and the exchange of a shared secret to be used later for encryption.

When at UT 108 arrives in the coverage area of an AP 104 it begins the registration process. Registration is a relationship that enables the UT 108 to exchange communications streams with the AP 104. The authentication protocol described with reference to FIG. 2 is a part of the registration process.

Since the authentication protocol described with reference to FIG. 2 is certificate-based, before registration begins the UT 108 and the AP 104 are each assigned at least one digital certificate from one or more trusted entities, such as certificate authorities ("CA"). A digital certificate is a text message that is signed by the CA. The signature may be a digest of the text message encrypted with a CA private key that only the CA has access to, but that can be verified by any entity which knows the CA public key which is openly available.

To verify a certificate, one decrypts the signature with the published CA public key and computes the digest from the text message. If these two text strings match, that the certificate was indeed signed by the CA. There are commercial CAs, such as VeriSign, Inc., or a network operator can create its own CAs. Public key cryptography and its use to create and verify digital certificates is well known.

In one embodiment, the UT 108 has no independent time reference and receives its sense of time from the AP 104. For example, the AP 104 can include an absolute frame number in a broadcast burst or some communication addressed to the UT 104.

The authentication protocol can begin when the UT 104 receives the AP certificate in block 202. The AP certificate can include an identity of the AP 104, such as a media access control (MAC) address of the AP 104, which identifies the AP 104 either uniquely or network-wide. The certificate also includes the AP public key that corresponds with the private key of the AP 104. The AP 104 may use different public/private key pairs for different UTs 108. As explained above, the AP certificate is signed by a CA trusted by the UT 108.

In block 204, the UT 108 generates a shared secret. This shared secret is only known by the UT 108 at this point and will only be shared with the AP 104. The shared secret can be generated as a random sequence using a random number sequence generator. In one embodiment, at least a part of this shared secret will later be used as a master secret to encrypt communications between the UT 108 and the AP 104 using symmetric key cryptography. The necessity of establishing such a secret for symmetric key cryptography is well known.

In block 206, the UT 108 generates an authenticator string. One key purpose of the authenticator string is to demonstrate that the UT 108 is in possession of the UT private key corresponding to the UT public key contained in the UT certificate. Since the CA certifies that the public key belongs to the UT 108, any device having the corresponding private key is the authentic UT 108.

There are numerous possible authenticator strings that can demonstrate possession of the UT private key. For example, the UT can encrypt a part of the shared secret with the private key. In one embodiment, the UT 108 can generate an authenticator message and sign it with the UT private key. If the AP 104 can independently generate the authenticator message, the authenticator string can be the signature only.

In block 208, the UT 108 scrambles the UT certificate given to in by the CA. The UT certificate includes an identifier of the UT 108, such as its MAC address, and a public key associated with the private key used to sign the authenticator string. The certificate can include various other data fields containing information about the UT 108. One reason for scrambling the UT certificate is to hide the UT identifier. This makes tracking the UT 108 difficult.

In one embodiment, the UT certificate is scrambled using at least a part of the shared secret. In one embodiment, the bits of the shared secret that are used for scrambling are not reused for symmetric key cryptography later on. For example, the designated scrambling bits of the shared secret can be used to seed a linear feedback shift register whose output can be used to scramble the UT certificate. In one embodiment, the bits generated by the linear feedback shift register are XOR-ed with the bits of the UT certificate.

In block 210, the UT 108 encrypts the shared secret generated in block 204 with the AP public key contained in the AP certificate received in block 202. In one embodiment, the UT also generates a timestamp in block 212. The timestamp represents time as known by the UT 108. In one embodiment, the UT 108 derives its sense of time from the AP 104 as explained above.

In block 214, the UT 108 sends a message to the AP 104 that the AP 104 can use to authenticate the UT 108. In one embodiment, the message includes the shared secret generated in block 204 and encrypted in block 210, the UT certificate issued by the CA and scrambled in block 208, and the authenticator string generated in block 206. Furthermore, the message can also include the timestamp generated in block 212 to protect against replay attacks.

In one embodiment, the message is a UT parameters message, which in addition to the above, also includes a variety of other information, some of which may be encrypted with the AP public key. For example, the UT parameters message can also include such parameters of the UT 108 as the communication capabilities and preferences of the UT 108.

The ordering of the blocks in FIG. 2 represents merely one embodiment, and is in no way limiting. In some embodiments, several values to be included in the UT parameters message can be pre-calculated causing some blocks will this be preformed in different orders. Other blocks can be completely omitted. For example, if the UT 108 already has a trusted time reference, e.g. when the UT 108 already has the time from an authenticated AP 104, block 226 and perhaps block 212 may be omitted. Furthermore, the UT 108 may have a stored copy of the AP certificate from a prior registration. In this case block 202 may have been already performed. In one embodiment, the UT 108 stores AP certificates, or at least AP public keys, for several frequently accessed APs 104.

In one embodiment, the UT 108 generates the shared secret in block 204 before registration even begins. In other embodiments, multiple shared secrets can be generated to be used for different access points 104. In one embodiment, The UT 108 generates the shared secret, block 204, and encrypts it with several stored AP public keys stored in memory, block 210, before ever receiving the AP certificate in block 202. Furthermore, once the shared secret is generated, block 204, it can be used to scramble the UT certificate, block 208, before registration even begins, and certainly before receiving the AP certificate in block 202. In other embodiments, the authenticator string can be generated in block 206 prior to receiving the AP certificate in block 202.

As demonstrated above, the blocks of FIG. 2 that are performed by the UT 108 can be performed in various orders, and the invention is not limited to any specific event flow. Various values may be pre-calculated before registration begins, or while awaiting a protocol response from the AP 104. Furthermore, some blocks may be performed in parallel, while others may simply be switched. Pre-calculating values and speculatively encrypting the shared secret by guessing the AP identity and public key can further increase the speed and efficiency of the authentication protocol.

Referring again to FIG. 2, in block 216, the AP 104 receives the UT parameters message sent by the UT 108. In block 218, the AP uses its private key to decrypt the shared secret. After the AP is in possession of the shared secret, in block 220, the AP can unscramble the UT certificate. Since at least a part of the shared secret was used in scrambling the UT certificate, only the AP 104 can unscramble it, since only the AP 104 has the AP private key necessary to decrypt the shared secret.

In block 222, the AP verifies the UT certificate by checking the CA signature and any validity period associated with the UT certificate. The UT certificate, as explained above, contains the UT public key, and the CA signature assures that this UT public key is assigned to a UT having the identifier, e.g., MAC address, also included in the UT certificate.

In block 224, the AP 104 authenticates the UT 108. This can be accomplished by using the authenticator string to verify that the UT 104 is in possession of the UT private key corresponding to the UT public key in the UT certificate. In one embodiment, the authenticator string is the UT signature over an authenticator message. The UT signature can be a digest, i.e. hash, of the authenticator message encrypted with the UT private key. Other digital signatures are also possible, such as encrypting the entire authenticator message, or a part thereof, with the UT private key.

In one embodiment, the AP 104 can generate the authenticator message and the authenticator message digest independently. In this case, the AP 104 decrypts the authenticator sting with the UT public key, generates a digest of the authenticator message, and compares the decrypted authenticator string to the independently generated authenticator message digest. In this manner, the AP 104 can verify that the UT 108 is in possession of the UT private key paired with the UT public key in the UT certificate.

In one embodiment, the UT 108 can also request time certification. In such an embodiment, the UT's 108 sense of time is derived from the AP 104 when the UT powers up. Thus, at least when a cold-start is performed but in other situations as well, an unauthorized AP could use an expired certificate and give a UT a false time reference that makes the certificate appear valid. To mitigate this problem, the UT 108 can ask the AP 108 to certify the timestamp generated by the UT 104 in block 212.

If the UT 108 requests time verification, in block 226, the AP can certify the timestamp. The timestamp can be included in the UT parameters message as a protection against replay attacks, but it can also be used for time certification. In one embodiment, the AP 104 performs time certification in block 226 by forwarding the timestamp to a trusted time server ("TS"). The TS is trusted by the UT 108, and can be a CA, or any server known to be operated by the network operator or some other trusted entity.

In one embodiment, the TS certifies the timestamp and sends it back to the AP 104, which in turn forwards it on the UT 108. In one embodiment, in block 228, the AP 104 sends a registration parameters message to the UT 108 including various registration parameters—such as random access channels, a paging identifier, and a registration identifier—and the certified timestamp is included in this message. In other embodiments, the TS may communicate the certification directly to the UT 108, or by some other means besides the AP 104.

According to one embodiment described with reference to FIG. 2, the AP 104 can authenticate the UT 108 using a single message from the UT 108. In one embodiment, all further communication between the UT 108 and the AP 104 is encrypted using the shared secret, or a part of it, for symmetric cryptography. In this case, when the AP 104 sends the registration message in block 228, the AP 104 is implicitly authenticated, since only the AP possessing the AP private key has the shared secret outside of the UT 108.

Figure 3:
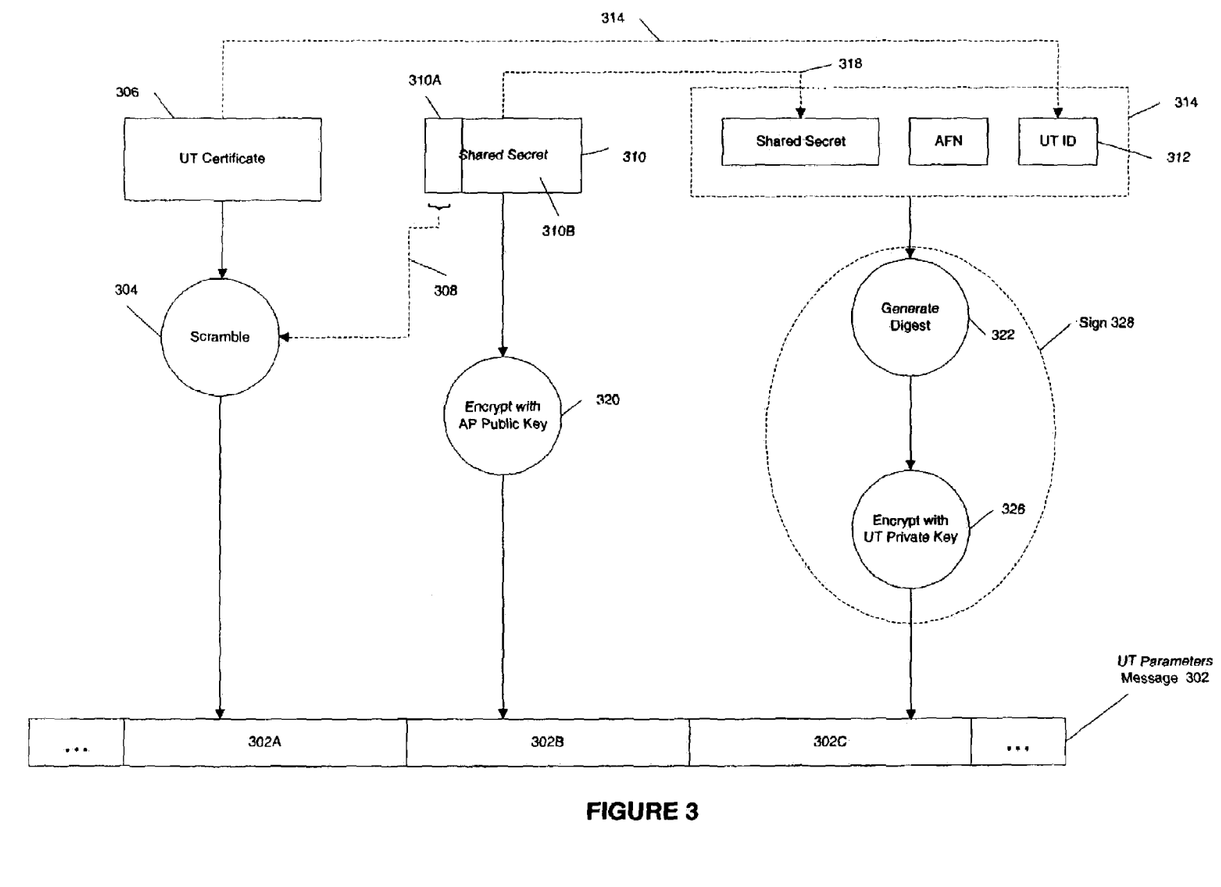
FIG. 3 is a simplified block diagram of a message used to authenticate a terminal according to one embodiment of the present invention.

As mentioned above, the UT parameters message, discussed above is enough for the AP 104 to authenticate the UT 108. FIG. 3 further demonstrates some aspects of the UT parameters message in accordance with a specific embodiment of the invention. As FIG. 3 illustrates, the UT parameters message 302 used to authenticate the UT 108 can have other fields. The message fields discussed with reference to FIG. 3 are message fields 302A, 302B, and 302C.

As described above, field 302A is generated by scrambling 304 the UT certificate 306. As shown by dotted line 308, a part 310A of the shared secret 310 is used for the scrambling 304. Secret 310A is used to initialize a linear feedback shift register. Then, the LFSR's output is XOR-ed with the UT certificate 306. This hides the UTID 312 from eavesdroppers, and makes UT tracking more difficult. To unscramble the UT certificate 306 an AP will need to know the shared secret 310.

Field 302B contains the shared secret 310 encrypted 320 with the AP public key. Since only the AP who possesses the private key corresponding with this public key can decrypt the shared secret 310, only this AP can unscramble the UT certificate.

Field 302C contains the authenticator string that proves possession of the UT private key. Generally, proof of a private key is demonstrated by sending a message signed with the private key. For efficiency, most digital signatures first generate a digest of the message and encrypt the digest with the private key.

Field 302C is generated by creating an authenticator message 314 including the UTID 312, i.e. MAC address, copied from the UT certificate 306 (as demonstrated by dotted line 316), a copy of the shared secret 310 (as demonstrated by line 318), and the absolute frame number of the frame when the UT parameters message 302 is to be sent. In one embodiment, the absolute frame number is a 48-bit number representing the number of 200 Hz periods since the beginning of the Global Positioning System GPS epoch. The absolute frame number is the primary time parameter for the UT in one embodiment. The authenticator message 314 thusly generated is unique, different with every registration, includes a temporal element—the absolute frame number—to protect against replay attacks, combines copied elements from other fields, and can be independently regenerated by the AP provided that the AP can decrypt the shared secret.

As explained above, the authenticator message is signed 328 by first generating a digest 322 of the authenticator message 314. The digest can be generated by a one-way hash function. The authenticator message digest is then encrypted 236 with the UT private key to produce the UT signature that is inserted into field 302C.

Since the AP can generate the authenticator message 314 independently and knows the hash function, the AP can verify possession of the UT private key by decrypting the received authenticator string in field 302C with the UT public key included in the UT certificate 306, and comparing the result with the independently generated authenticator message digest.

As mentioned with reference to FIG. 2, fields 302A, 302B, and 302C can be pre-computed. The shared secret 310—which is a random sequence—can be generated at any time. Field 302A can thus be generated at any time, although scrambling does not require intensive computing and can also be performed in real time.

To generate field 302B, the AP public key must be known. A UT can store the public keys of some APs that the UT frequently communicates with. If the UT encrypts 320 the shared secret with all the public keys stored by the UT, when the AP is identified, no more encryption is necessary; the appropriate encrypted version of the shared secret can be inserted for field 302B. In this manner, the UT can speculatively pre-calculate field 302B before even receiving the AP certificate. When the AP certificate is received, the UT need only verify that the public key stored for the particular AP is still valid.

Field 302C can also be speculatively pre-calculated. After registration has begun, the UT can guess at the absolute frame number in which the UT parameters message 302 will be transmitted. The other elements of the authenticator message 312 are known. Thus, after guessing one or more absolute frame numbers, one or more possible authenticator messages can be generated, and each encrypted 326 with the UT private key. When the UT parameters message's 302 absolute frame number is known, the correct one can be inserted into field 302C. If all guesses were wrong, a new authenticator string could be calculated without losing any time, since without guessing, the generation could not have yet begun.

Access Point Structure

Figure 4:
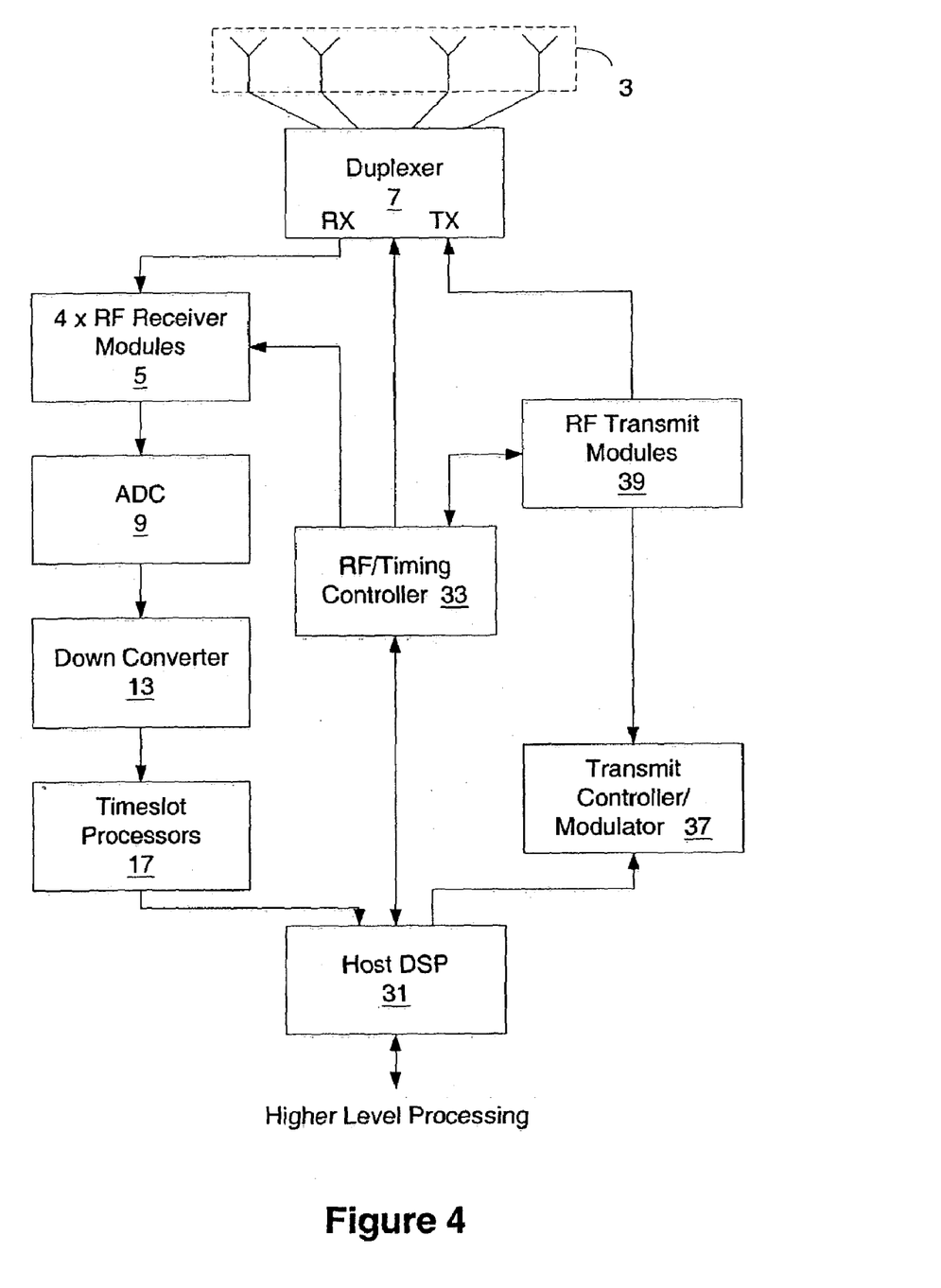
FIG. 4 is a simplified block diagram of an access point on which an embodiment of the invention can be implemented.

Embodiments of an AP 104 and a UT 108 of a wireless access network are now described. FIG. 4 shows an example of an AP of a wireless access network or cellular communication network suitable for implementing the present invention. The system or network includes a number of subscriber stations, also referred to as remote terminals or UTs, such as that shown in FIG. 1 as UT 108 and in detail in FIG. 5. The AP may be connected to a wide area network (WAN) or the Internet through its host DSP 31 for providing any required data services and connections external to the immediate wireless system. To support spatial diversity, a plurality of antennas 3 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the AP to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. Nos. 5,828,658, issued Oct. 27, 1998 to Ottersten et al. and 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and 1F carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 (hereinafter "timeslot processor") for further processing, including calibration, according to one aspect of this invention. Eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each UT to the host DSP 31. The host DSP 31 maintains state and timing information, receives uplink burst data from the time slot processors 17, and programs the timeslot processors 17. In addition it decrypts, descrambles, checks error correcting code, and deconstructs bursts of the uplink signals, then formats the uplink signals to be sent for higher level processing in other parts of the AP. Furthermore DSP 31 may include a memory element to store data, instructions, or hopping functions or sequences. Alternatively, the AP may have a separate memory element or have access to an auxiliary memory element. With respect to the other parts of the AP it formats service data and traffic data for further higher processing in the AP, receives downlink messages and traffic data from the other parts of the AP, processes the downlink bursts and formats and sends the downlink bursts to a transmit controller/modulator, shown as 37. The host DSP also manages programming of other components of the AP including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7.

User Terminal Structure

Figure 5:
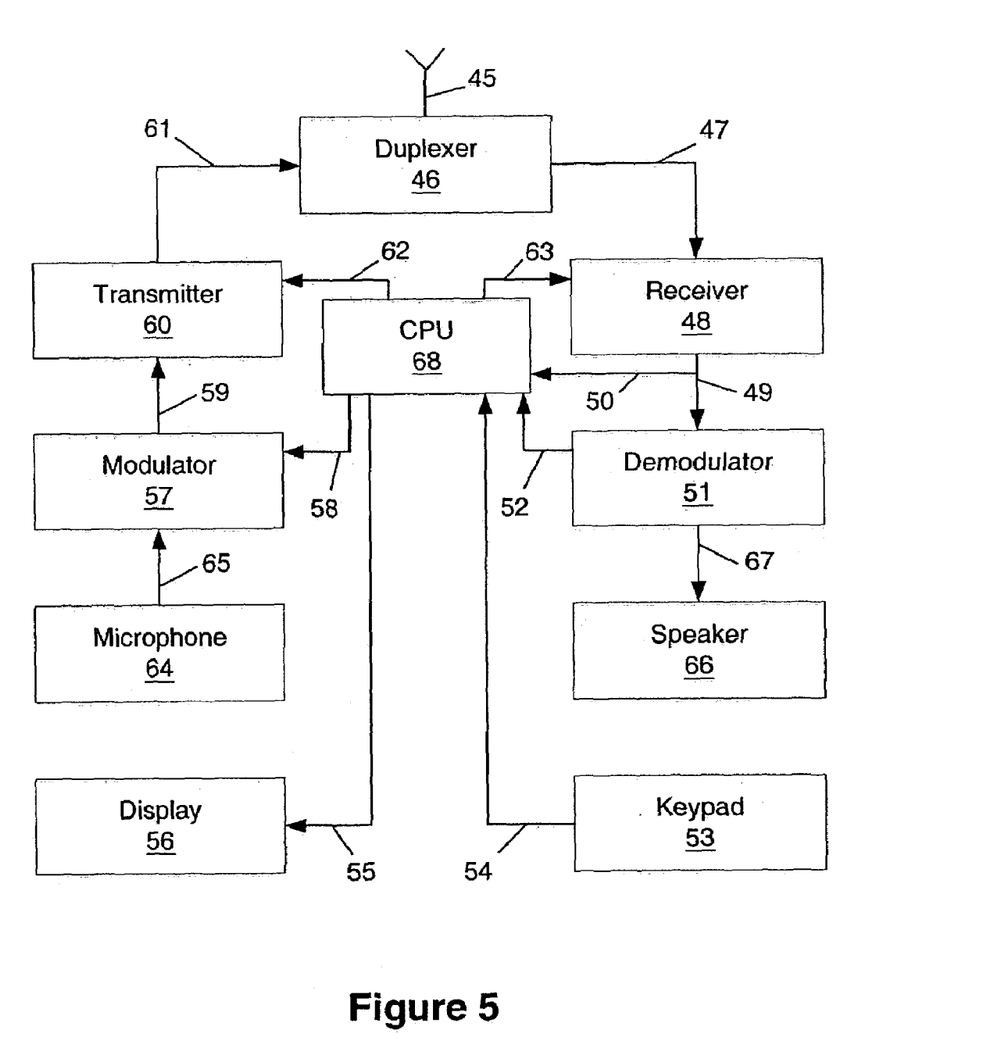
FIG. 5 is a simplified block diagram of a user terminal on which an embodiment of the invention can be implemented.

FIG. 5 depicts an example component arrangement in a UT that provides data or voice communication. The user terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the AP. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The user terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a user terminal central processing unit 68 (CPU) as is received data before demodulation 50. The user terminal CPU 68 can be implemented with a standard DSP (digital signal processor) device such as a Motorola series 56300 Family DSP. This DSP can also perform the functions of the demodulator 51 and the modulator 57. The user terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications user terminal. In another embodiment, the microphone and speaker are also in direct communication with the CPU to provide voice or data communications. Furthermore user terminal CPU 68 may also include a memory element to store data, instructions, and hopping functions or sequences. Alternatively, the user terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the user terminal's CPU is coupled to a standard digital interface such as a PCMCIA interface to an external computer and the display, keyboard, microphone and speaker are a part of the external computer. The user terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 4 and 5, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the AP or the UT. However, many of the steps described as being performed by the AP may be performed by the UT and vice versa. Furthermore, the invention is equally applicable to systems in which terminals communicate with each other without either one being designated as a AP, a UT, a user terminal or a subscriber station. Thus, the present invention is equally applicable and useful in a peer-to-peer wireless network of communications devices. In such a network, during the execution of the authentication protocol the devices would take turns acting in the manner of the UT and the AP described above. These devices may be cellular phones, PDA's, laptop computers, or any other wireless devices. Generally, since both the APs and the UTs use radio waves, they are sometimes referred to as radios.

In portions of the description above, only the AP is described as performing spatial processing using an antenna array. However, the UTs can also contain antenna arrays, and can also perform spatial processing both on receiving and transmitting (uplink and downlink) within the scope of the present invention.

Embodiments of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and calculations are described in their most basic form, but steps can be added to or deleted from any of the methods and information can be added or subtracted from any of the described message signals without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method performed by a user terminal of a wireless access network, the method comprising:
   obtaining a time reference from an access point of the wireless access network;
   receiving a digital certificate issued by a certificate authority from the access point;
   requesting certification of the time reference by a trusted entity;
   receiving certification of the time reference by sending a message used to authenticate the user terminal to the access point, the message containing a timestamp based on the time reference, an identification of the trusted entity by which certification is to be performed, and a list of trusted entities by which certification may be performed; and
   validating the digital certificate.

2. The method of claim 1, wherein receiving certification of the time reference comprises receiving a message from the access point, the message being signed by the trusted entity and containing information to verify the timestamp.

3. The method of claim 1, wherein requesting certification of the time reference comprises sending a message to the trusted entity, the message containing a timestamp and a request to compare the timestamp to a local time of the trusted entity.

4. The method of claim 1, wherein the digital certificate has a validity period, and wherein validating the access point comprises determining whether the validity period has expired using the certified time reference.

5. The method of claim 1, wherein the time reference comprises an absolute frame number.

6. A user terminal comprising:
   a clock to maintain a time reference obtained from an access point;
   a transmitter to send a request for certification of the time reference by a trusted entity by sending a message used to authenticate the user terminal to the access point, the message containing a timestamp based on the time reference maintained by the clock, an identification of the trusted entity by which certification is to be performed, and a list of trusted entities by which certification may be performed;
   a receiver to receive the certification of the time reference and a digital certificate issued by a certificate authority from the access point; and
   a processor coupled to the receiver to validate the digital certificate.

7. The user terminal of claim 6, wherein the user terminal receives the certification of the time reference by receiving a message from the access point, the message being signed by the trusted entity and containing information to verify the timestamp.

8. The user terminal of claim 6, wherein the user terminal requests certification of the time reference by sending a message to the trusted entity, the message containing a timestamp based on the time reference maintained by the clock and a request to compare the timestamp to a local time of the trusted entity.

9. The user terminal of claim 6, wherein the digital certificate has a validity period and wherein the user terminal validates the access point by determining whether the validity period has expired using the certified time reference.

10. The user terminal of claim 6, wherein the time reference comprises an absolute frame number.

11. A method performed by an access point of a wireless access network, the method comprising:
    receiving a message including a timestamp from a user terminal of the wireless access network, a request that the timestamp the certified by the trusted entity, and an identification of the trusted entity; wherein the identification of the trusted entity comprises a list of entities trusted by the user terminal;
    authenticating the user terminal using the message;
    sending a request for certification of the timestamp to a trusted entity that is trusted by the user terminal;
    receiving a time certification message signed by the trusted entity including a verification of the timestamp; and
    sending the time certification message to the user terminal.

12. The method of claim 11, wherein sending a request for certification of the timestamp comprises forwarding the timestamp to the trusted entity so that the trusted entity can compare the timestamp to a local time of the trusted entity.

13. An access point comprising:
    a receiver to receive a message including a timestamp from a user terminal, the received message further including a request that the timestamp be certified by the trusted entity and an identification of the trusted entity, the identification of the trusted entity comprising a list of entities trusted by the user terminal;
    a processor coupled to the receiver to authenticate the user terminal based on the received message; and
    a transmitter coupled to the processor, to send a request for certification of the timestamp to a trusted entity that is trusted by the user terminal, and to forward a certification message received from and signed by the trusted entity, the certification message including a verification of the timestamp.

14. The access point of claim 13, wherein the transmitter further forwards the timestamp to the trusted entity so that the trusted entity can compare the timestamp to a local time of the trusted entity.

15. A machine-readable medium storing data representing instructions that, when executed by a processor of a user terminal, cause the processor to perform operations comprising:
  obtaining a time reference from an access point;
  receiving a digital certificate issued by a certificate authority from the access point;
  requesting certification of the time reference by a trusted entity by sending a message used to authenticate the user terminal to the access point, the message containing a timestamp based on the time reference, an identification of the trusted entity by which certification is to be performed, and a list of trusted entities by which certification may be performed;
  receiving certification of the time reference; and
  validating the digital certificate.

16. The machine-readable medium of claim 15, wherein receiving certification of the time reference comprises receiving a message from the access point, the message being signed by the trusted entity and containing information to verify the timestamp.

17. The machine-readable medium of claim 15, wherein requesting certification of the time reference comprises sending a message to the trusted entity, the message containing a timestamp and a request to compare the timestamp to a local time of the trusted entity.

18. The machine-readable medium of claim 15, wherein the digital certificate has a validity period, and wherein validating the access point comprises determining whether the validity period has expired using the certified time reference.

19. The machine-readable medium of claim 15, wherein the time reference comprises an absolute frame number.

20. A machine-readable medium storing data representing instructions that, when executed by a processor of an access point, cause the processor to perform operations comprising:
  receiving a message including a timestamp from a user terminal, the message further including a request that the timestamp be certified by the trusted entity and an identification of the trusted entity, wherein the identification of the trusted entity comprises a list of entities trusted by the user terminal;
  authenticating the user terminal using the message;
  sending a request for certification of the timestamp to a trusted entity that is trusted by the user terminal;
  receiving a time certification message signed by the trusted entity including a verification of the timestamp; and
  sending the time certification message to the user terminal.

21. The machine-readable medium of claim 20, wherein sending a request for certification of the timestamp comprises forwarding the timestamp to the trusted entity so that the trusted entity can compare the timestamp to a local time of the trusted entity.

22. A method performed by a user terminal of a wireless access network, the method comprising:
  obtaining a time reference from an access point of the wireless access network;
  receiving a digital certificate issued by a certificate authority from the access point;
  requesting certification of the time reference by a trusted entity by sending a message used to authenticate the user terminal to the access point, the message containing a timestamp based on the time reference and an identification of the trusted entity by which certification is to be performed;
  receiving certification of the time reference by receiving a message from the access point, the message being signed by the trusted entity and containing information to verify the timestamp; and
  validating the digital certificate.

23. The method of claim 22, wherein the message contains a list of trusted entities by which certification may be performed.

24. The method of claim 22, wherein requesting certification of the time reference comprises sending a message to the trusted entity, the message containing a timestamp and a request to compare the timestamp to a local time of the trusted entity.

25. The method of claim 22, wherein the digital certificate has a validity period, and wherein validating the access point comprises determining whether the validity period has expired using the certified time reference.

26. The method of claim 22, wherein the time reference comprises an absolute frame number.

27. A user terminal comprising:
  a clock to maintain a time reference obtained from an access point;
  a transmitter to send a request for certification of the time reference by a trusted entity by sending a message used to authenticate the user terminal to the access point, the message containing a timestamp based on the time reference maintained by the clock and an identification of the trusted entity by which certification is to be performed;
  a receiver to receive the certification of the time reference and a digital certificate issued by a certificate authority from the access point by receiving a message from the access point, the message being signed by the trusted entity and containing information to verify the timestamp; and
  a processor coupled to the receiver to validate the digital certificate.

28. The user terminal of claim 27, wherein the message contains a list of trusted entities by which certification may be performed.

29. The user terminal of claim 27, wherein the user terminal requests certification of the time reference by sending a message to the trusted entity, the message containing a timestamp based on the time reference maintained by the clock and a request to compare the timestamp to a local time of the trusted entity.

30. The user terminal of claim 27, wherein the digital certificate has a validity period and wherein the user terminal validates the access point by determining whether the validity period has expired using the certified time reference.

31. The user terminal of claim 27, wherein the time reference comprises an absolute frame number.

* * * * *